United States Patent
Chazan et al.

(10) Patent No.: US 9,632,912 B1
(45) Date of Patent: Apr. 25, 2017

(54) METHOD AND SYSTEM FOR DEBUGGING A PROGRAM

(71) Applicant: Cadence Design Systems, Inc., San Jose, CA (US)

(72) Inventors: Nadav Chazan, Ness Ziona (IL); Yonatan Ashkenazi, Rehovot (IL)

(73) Assignee: CADENCE DESIGN SYSTEMS, INC., San Jose, CA (US)

(*) Notice: Subject to any disclaimer, the term of this patent is extended or adjusted under 35 U.S.C. 154(b) by 0 days.

(21) Appl. No.: 14/228,325

(22) Filed: Mar. 28, 2014

(51) Int. Cl.
*G06F 9/44* (2006.01)
*G06F 11/36* (2006.01)

(52) U.S. Cl.
CPC .................. *G06F 11/3636* (2013.01)

(58) Field of Classification Search
None
See application file for complete search history.

(56) References Cited

U.S. PATENT DOCUMENTS

| | | | |
|---|---|---|---|
| 6,785,884 B1* | 8/2004 | Rieschl | 717/129 |
| 2005/0055675 A1* | 3/2005 | Neifert | G06F 17/5022 717/135 |
| 2014/0033183 A1* | 1/2014 | Brown | G06F 11/3636 717/131 |

* cited by examiner

*Primary Examiner* — Qamrun Nahar
(74) *Attorney, Agent, or Firm* — Pearl Cohen Zedek Latzer Baratz LLP

(57) ABSTRACT

A system and method of debugging a program may include obtaining a selection of a portion of the program which is between trackable inputs and outputs. The method may also include simulating an execution on the portion of the program, by providing input data via the inputs that was input through said inputs during a recorded execution of the program. The method may further include presenting information relating to the simulated execution on an output device.

13 Claims, 5 Drawing Sheets

METHOD AND SYSTEM FOR DEBUGGING A PROGRAM

FIELD OF THE DISCLOSURE

The present invention relates to debugging. More specifically, the present invention relates to debugging a program.

BACKGROUND

Debugging is a methodological process to systematically search for anomalies or discrepancies (hereinafter—anomalies) in a computer program or a hardware design (hereinafter—program) and to fix them after the anomalies are found in the program.

Typically, debugging extends from finding and fixing small errors to lengthy and tedious data collecting, analysis and scheduling updates.

Debugging is a painstaking task that may involve long hours or days of searching for anomalies in a program. It involves human skills and typically depends on the programming language being used and the available debugging tools.

SUMMARY

Disclosed are various embodiments, including a computer implemented method of debugging a computer program, software or code. The method may include obtaining a selection of a portion of the program which is between trackable inputs and outputs. The method may also include simulating an execution on the portion of the program, by providing input data via the inputs that was input through said inputs during a recorded execution of the program. The method may further include presenting information relating to the simulated execution on an output device.

According to some embodiments the method may further include obtaining the selection of the portion of the program from a user via a user interface.

In some embodiments the selected portion of the program may include one or a plurality of modules.

In some embodiments the method may further include obtaining a selection of a closest enclosing module that includes modules in which a suspected bug exists.

In some embodiments of the present invention the selected portion of the program comprises one or a plurality of methods.

According to some embodiments the method may further include obtaining an indication of a method invocation of the recorded execution of the program that revealed a suspected bug.

In some embodiments the input data may be obtained from local variables, global variables, parameters, objects, signals, registers, and other methods that are used or referred to by the indicated method.

According to some embodiments of the present invention the method may further include obtaining from a user one or a plurality of amendments to a code of the program.

In some embodiments the method may further include obtaining a time window covering a time segment of the recorded execution of the program from a user and providing input data via the inputs that was input through said inputs during the recorded execution of the program within the time window.

According to some embodiments there is provided a non-transitory computer readable storage medium for debugging a program having stored thereon instructions that when executed by a processor will cause the processor to perform a method according to the present invention. For example, the instructions may cause the processor to obtain a selection of a portion of the program which is between trackable inputs and trackable outputs; to simulate an execution on the portion of the program, by providing input data via the inputs that was input through said inputs during a recorded execution of the program; and to present information relating to the simulated execution on an output device.

According to some embodiments there is also provided a system for debugging a program, the system comprising a processing unit configured to obtain a selection of a portion of the program which is between trackable inputs and outputs; to simulate an execution on the portion of the program, by providing input data via the inputs that was input through said inputs during a recorded execution of the program; to record the simulated execution; and to present information relating to the recorded simulated execution on an output device.

In some embodiments the system may further include an input device for obtaining the selection of the portion of the program.

In some embodiments the system may further include the output device.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION

Figure 1:
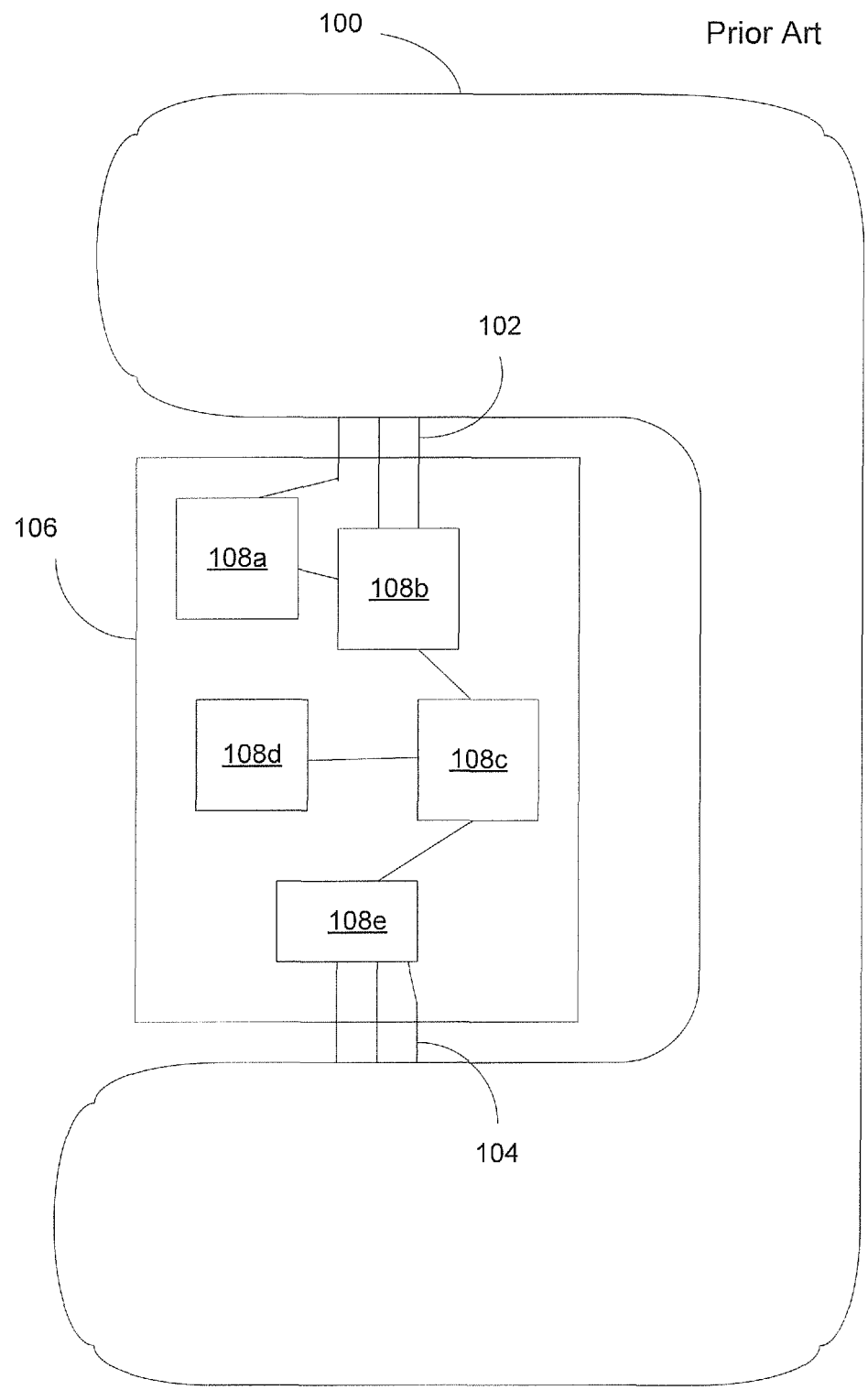
FIG. 1 illustrates a debugging scenario of an entire design environment of a program (prior art).

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

A debugging tool typically allows a programming expert (hereinafter—programmer) to follow the execution of a software program or an electronic hardware design (hereinafter, for the sake of brevity, collectively—program) detect anomalies and figure out their cause or causes. Typically a debugging tool displays a source code or assembly code of the program under test on a user interface (hereinafter referred to as UI). The debugging tool offers various functions, such as performing break point setting, step execution, and the like. For example, in step execution using the UI, the debugging tool executes one or several lines of the source code or one instruction of the assembly code, and if there is a problematic code which leads to an error in a result of execution of the one instruction of the source code or assembly code, the debugging tool highlights a problematic portion or displays an auxiliary code, message, or the like which represents details of the error. The ability to examine an execution of a program step by step helps a human user to find anomalies (bugs) and fix them (debug).

Debugging—and in particular debugging of large environments or designs—is a time consuming task. Looking for a cause of a bug may take hours and days. Upon finding a possible cause of a bug a debugging expert typically tries to fix it and makes sure the fix works well. In large environments or designs re-compiling, elaborating and simulating the same execution (or run, as it is sometimes called) again may also take long hours, even if the fix only relates to a small code segment or one specific module. Even after re-compilation, elaboration and simulation, there is no guarantee that the exact same scenario that caused the bug would be reproduced.

Sometimes, first attempts at fixing a bug fail and the process described above has to be repeated several times until the bug is fixed and verified.

A post-process debugging method was introduced which involves recording a specific program execution and allowing an on-line or off-line analysis of that execution. When recording the execution, all execution events that had occurred in that execution are saved.

An "execution event", in the context of the present disclosure, refers to any event that has occurred during the execution of the program, and may include, for example, a code line that was executed, a routine that was called, a parameter that was calculated, a variable that has been assigned a value, a signal's value being changed, a register being assigned with a value, a status of a computing environment, an indication (e.g., text, line, or location within a source code representation or other representation of the software program being debugged, a function currently being executed, an instruction that called the function being currently executed, or other indication) of an instruction that is being executed or that was most recently executed, an address of a variable or instruction, or other relevant information that may be displayed or otherwise made available to a user of the debugging tool, etc.

Information relating to the execution events encountered during an execution may be recorded (e.g., saved into a database, memory, etc.), allowing the review of the recorded execution in a user interface while mimicking the look and feel of a regular debugging tool. Thus, the human user (hereinafter—user) can go back and forth (up to the last execution event that was recorded) and view various execution events of that specific execution, including the related information of these events. Using such a post-process debug method allows the user to analyze any execution event and find the execution events that caused it to occur the way it did.

FIG. 1 illustrates a debugging scenario of an entire design environment of a program (prior art).

Program 106 may be a device under test (DUT) that is being debugged by a debugging tool 100. Program 106 may include a plurality of modules or methods 108a-108e (hereinafter, for brevity—modules). The debugging tool 100 provides inputs 102 to DUT 106 and collects outputs 104 from DUT 106. The execution data of a specific execution, including data on calls, variables, function calculations or signals and registers value changes relating to modules 108a-108e of DUT 106 that were executed in that specific execution, and changes in that data over time, are saved for later use.

The debugging expert may decide to focus on a specific module—e.g., 108c. This may happen, for example, when the debugging expert suspects that module 108c may be the place to look for a bug that causes the DUT to malfunction.

According to embodiments of the present invention, this is made possible by configuring the debugging tool to allow the debugging expert to select a specific portion of the program which is of interest, for example by presenting this option to the debugging expert on a user interface (UI) and obtaining the expert's selection.

This may become possible after at least one simulation execution was carried out on the entire program which was recorded. It is understood that such at least one simulation may have terminated unexpectedly, or may have run fully, but resulted with errors, all of which indicate that further debugging is needed. By "recorded" is meant, in the context of the present specification, that information relating to the execution events encountered during said at least one simulation execution has been recorded, e.g., saved to memory or other storage, for post-process debugging.

The selected portion is typically a sub-program which has input or inputs from one or more modules of the program, or from the external input of the program. Such section may be, for example a single module with input/s and output/s, or a plurality of modules, located between trackable inputs (one or more). "Trackable" as used herein may mean that the input/s were previously recorded, in such a way that it is possible to track the data that was passed through during the recorded simulation execution.

According to embodiments of the present invention, when it is desired to focus a debugging effort on a portion of a program (e.g., a specific method or methods or a specific module or modules), after at least one execution performed on the entire program and recording data relating to execution events of that run for post process debugging, a "slim" test environment is created that is able to recreate the exact same scenario and run it only on the specific method/module.

If for example the user wants to find and fix a suspected bug within a hardware description language (HDL) type module (e.g., a Verilog module), the debugging tool may be configured to create a new test file that instantiates an instance of that module, initiates the internal registers and wires, and feeds it the recorded inputs. The debugging tool, according to some embodiments of the present invention, may obtain from (e.g. receive input from) the user one or a plurality of amendments to a code of the program. The user may thus be allowed to add checks and assertions to the test file, edit the buggy module and compile and run only this slim environment instead of the entire design and environment.

Figure 2:
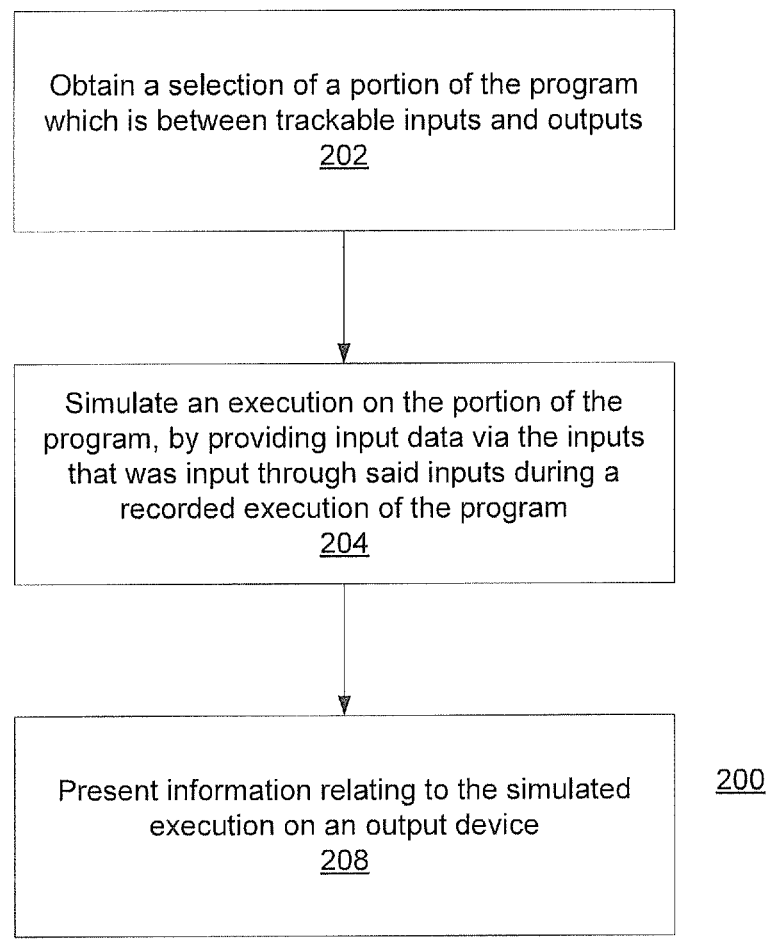
FIG. 2 illustrates a method for debugging a program according to some embodiments of the present invention.

FIG. 2 illustrates a method of debugging a program according to some embodiments of the present invention.

Method 200 may include obtaining 202 a selection of a portion of the program which is between (e.g., in a sequence of code or instructions, in the portion of the sequence between) trackable inputs and outputs. Method 200 may also include simulating 204 an execution on the portion of the program, by providing input data via the inputs that was input through said inputs during a recorded execution of the program. Method 200 may further include presenting 208 information relating to the simulated execution on an output device.

In some embodiments the simulated execution may be recorded.

In some embodiments, e.g., when dealing with methods the result of the invocation of the selected method may be printed or otherwise presented to the debugging expert.

In some embodiments, the method may include providing the debugging expert with the ability to amend code of the program being debugged. This may be done, for example, by facilitating editing of the code using a user interface (e.g., GUI), before or after running the simulated execution of the portion of the program.

In some embodiments of the present invention, the portion of the program may contain a single module. In some other embodiments the portion of the program may include more than one module, for example a plurality of modules. In a case of a register-transfer level (RTL) design, including one or a plurality of modules, that undergoes debugging, the user will select the closest enclosing module that includes all the involved modules in which a suspected bug exists. By "enclosing module" is meant, in the context of the present specification, a portion of the program that can be considered as a module with trackable inputs. The simulated execution may then initiate all internal registers and wires, and feed only the inputs of that enclosing module. A debugging tool according to some embodiments of the present invention may also be able to create slim environments for testing fixes in a test bench (TB) environments. In such a case the user may be asked to indicate which method/function to fix and the specific instance of the method invocation that revealed the bug (the ability to pick one invocation already exist in some debugging tools, such as the debugging tool branded as Incisive debug Analyzer). In such a case, the input data of the slim environment may include local variables, global variables, parameters, objects, signals, registers, and other methods that are used or referred to by the specified method. This may be done recursively for all the methods that are called from the specified method. The simulation execution created instantiates all the relevant components and initiates the value of the relevant fields. The simulation execution of the specific method may then invoke the specified method with the recorded inputs and allow the user to add his assertions and checks for the method output.

In some embodiments of the present invention the debugging tool may also create a wrapping script that compiles and runs the slim environment.

In some embodiments of the present invention, when debugging, for example a RTL module the user may be allowed to specify a time window or period to be used for the simulated execution of the portion of the program. The time window may cover a time segment or period of the recorded execution of the program. In such a case the debugging tool may initiate internal values as they were at the beginning of the time window and feed only the inputs of that time window to the inputs of the selected portion of the program. By doing that more time may be saved.

The slim environment simulated execution of the selected portion of the program, according to some embodiments of the present invention introduces several advantages, some of which may include slim environment simulated execution of the selected portion of the program may be compiled and executed considerably faster than compiling and executing the entire design/environment of the program. This may mean in many cases saving hours of debugging time. Furthermore, slim environment simulated execution of the selected portion of the program may allow reproducing the exact same scenario that revealed the bug. Re-running the execution of the entire program may not necessarily result in reproduction of the exact same scenario. Thus the debugging expert is offered, when using a debugging method according to some embodiments of the present invention, a way of ensuring that the bug was fixed and not just masked.

Example 1 (Module)

Following is an example of applying slim environment debugging to a Verilog module, according to some embodiments. Embodiments of the present invention may be applied other programming language modules and on other languages. The module presented bellow is supposed to calculate the parity of an input data, and does so only when parity_en is true (a flag which means that parity is enabled). The bug in the module is in italics and underlined—it would appear that the owner of that code copy-pasted one line several times and forgot to fix the index in one of the resulting lines.

```
module parity
  //inputs
  data,
  parity_en,
  //outputs
  parity)
  );
input [31:0] data;
input parity_en;
output [7:0] parity;
reg [7:0] parity;
reg parity_en_reg;
always @(parity_en)
begin
  parity_en_reg<=parity_en;
end
always @(data)
begin
  if (parity_en_reg==1'b1) begin
    parity[0]=data[0]^data [8]^data[16]^data[24];
    parity[1]=data[1]^data [9]^data[17]^data[25];
    parity[2]=data[2]^data [10]^data[18]^data[26];
    parity[3]=data[3]^data [11]^data[19]^data[27];
    parity[4]=data[4]^data [12]^data[20]^data[28];
```

```
    parity[5]=data[4]^data [13]^data[21]^data[29];
    parity[6]=data[6]^data [14]^data[22]^data[30];
    parity[7]=data[7]^data [15]^data[23]^data[31];
  end else begin
    parity=8'h00;
  end
end
endmodule
```

Figure 3A:
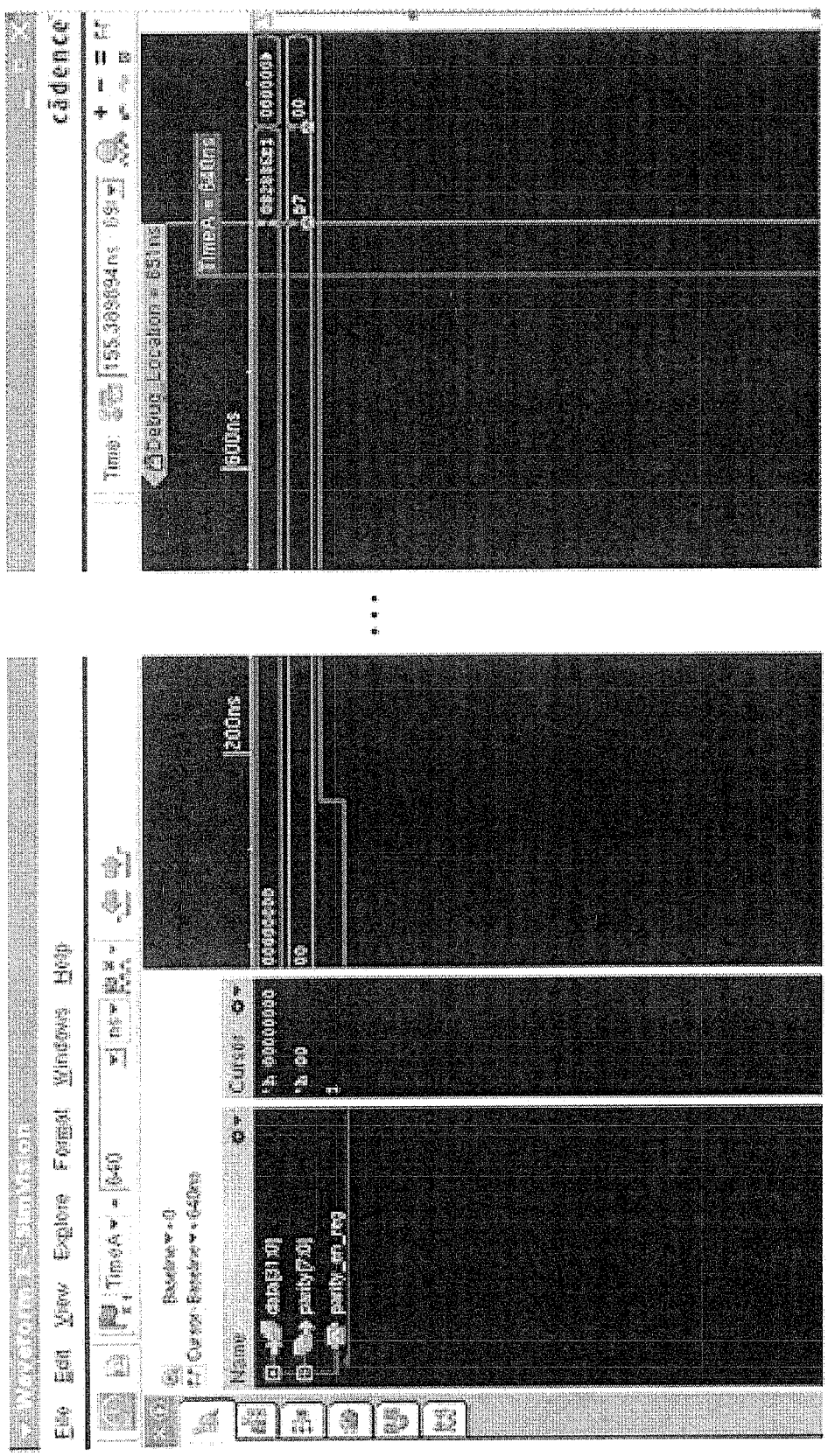
FIG. 3A shows a screen of a graphical user interface (GUI) of a debugging tool, according to some embodiments of the present invention.

Such module would typically be a part of a big design constructed by tens, hundreds or even thousands of modules. Assume that while testing the big design it is found that when the input data was set to 0x082836e1 the value of parity was calculated to be D7 (While the right parity value should have been F7). FIG. 3A shows a screen shot of a graphical user interface (GUI) of a debugging tool, according to some embodiments of the present invention, in which the values of the different signals in the original test are shown. A long period in the waveform was skipped so it would fit the screen, the skipped part is not relevant to the failure of the test. After a debugging run the debugging experts has found the wrong line of code and fixed it. In order to verify that the fixed version truly meets the debugging expert's expectations a slim environment debugging according to some embodiments of the present invention may be applied, where a time range [in this example—645 ns, 685 ns] is specified as the time window for which input from the original recorded execution of the program will be used in the simulated execution of the portion of the program. The fixed parity module is copied into the debugging tool and the following file may automatically be created (the "//(<number>)" comments are there to help explain the work of the debugging tool and are not really generated as part of the code):

```
module chb_parity_test_env ( );
//(1)
reg [31:0] data_driver;
reg parity_en_driver;
wire [7:0] parity_output;
//(2)
parity chb_parity (
    .data(data_driver),
    .parity_en(parity_en_driver),
    .parity(parity_output))
  );
//(3)
initial
  begin: init_internals_time_645 ns
    chb_parity.parity=0;
    chb_parity.parity_en_reg=1;
  end
//(4)
initial
  begin: drive_data
    data_driver=0;
    #6;
    data_driver='h082836e1;
    #20;
    data_driver=0;
  end
//(5)
initial
  begin: drive_parity_en
    parity_en_driver=1;
  end
//(6)
initial
  begin: run_40 ns_and_finish
    #40;
    $finish;
  End
endmodule
```

The code segment that starts after "//(1)" creates a driver for each one of the input parameters that the original parity module has, and a "loader" for each output parameter. The drivers (data_driver, parity_en_driver) may later be used to set the values of data and parity_en of the parity module and the "loader" (parity_output) may be used to monitor the output of parity of that module.

The second code segment instantiates one instance of the parity module and connects the drivers and loaders created in segment (1) to it.

The third segment initializes the values of the two registers of the newly created parity instance (parity and parity_en_reg) to the values they had in the original recorded execution of the program at time 645 ns.

The fourth segment is responsible for setting the value of data_driver (and by that of the data input of the new parity instance) to be exactly as they were in the originally recorded execution of the program. At time 0 (representing time 645 ns in the originally recorded execution of the program) the value is set to 0. 6 ns later it is set to 0x082836e1 (as it did in the originally recorded execution of the program at time 651 ns). 20 ns later it is set back to 0.

The fifth segment does the same for parity_en_driver. This time the driver is set to 1 and stays that way as the corresponding input did in the originally recorded execution of the program during the selected time window.

The role of the sixth segment is to make sure the new test will end after 40 ns.

Figure 3B:
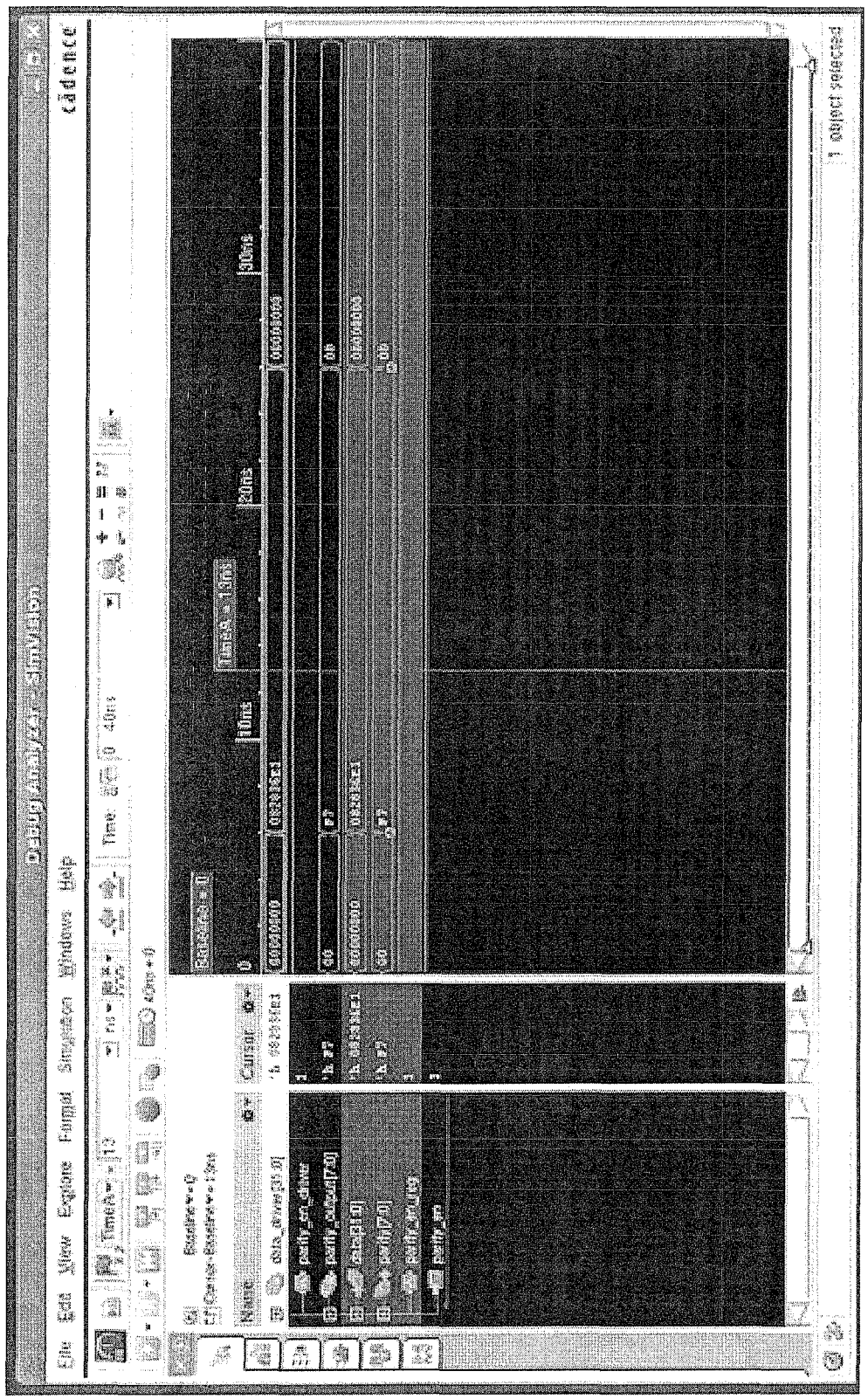
FIG. 3B is a screen shot of a graphical user interface (GUI) of a debugging tool, according to some embodiments of the present invention.

FIG. 3B is a screen shot of a graphical user interface (GUI) of a debugging tool, according to some embodiments of the present invention that shows a representation of the different signals in the new, slim environment debugging run. As seen in the figure parity_driver and parity are set to 0x082836e1 at time 6 ns and parity (and parity_output) are calculated to F7 as would have been expected, indicating that the bug was properly fixed.

Example 2 (Method)

This is an example of applying slim environment debugging to an e language verification method, according to some embodiments, but embodiments of the present invention may be applied to other programming languages, and not necessarily to verification languages only.

The "limiter" feature in this example is used to limit the value of each byte of data. When the limiter is enabled the DUT and the verification environment ensure that each byte does not contain a value bigger than limit_val, and if it is—it is set to the value of limit_val.

The bug in the example is in the understanding of the specification. The debugging expert has (wrongly) understood that the value must be lower than limit_val while the designer meant for the value to be no higher than limit_val. The error is represented by the −1 underlined and bold in the code below.

```
unit channel_scoreboard_u like any_unit {
  ...
  predict_output(trans: cdn_parallel_transfer, muter_en:
      bool,limiter en: bool,limit_val: byte,parity_en: bool,
      inv_en: bool):cdn_multi_master_transfer is {
    result=new;
    result.channel=channel_id.as_a (bit);
    if (muter_en) then {
      result.data=0;
    } else if (limiter_en) then {
      result.data[31:24]=min(trans.data[31:24],limit_val-
          1);
      result.data[23:16]=min(trans.data[23:16],limit_val-
          1);
      result.data[15:8]=min(trans.data[15:8],limit_val-1);
      result.data[7:0]=min(trans.data[7:0],limit_val-1);
    } else {--no muter and no limiter
      result.data=trans.data;
    };
    if (parity_en) then {
      result.generate_parity( );
    } else {
      result.parity=0;
    };
    if (inv_en==TRUE) then {
      result.data=result.data ^ 32'hffffffff;
    };
  };
  ...
};
```

In a specific execution of the specific method, the bug caused data to be 0x73737373 in the OUT packet and 0)(72727272 in the VE packet. Once the debugging expert realizes his (her) mistake he (she) will want to remove the "−1" and make sure that the data 0)(73737373 is returned. According to some embodiments of the invention, the debugging expert may pick the specific execution of the method—the one that created the error—and create a small test case (a specific method of the program) that allows reproducing and fixing of the bug. The debugging expert may also request picking several executions of the method, but for brevity, an example of one execution is described herein.

According to some embodiments, the debugging expert would select a portion of the program being debugged (a specific method). According to some embodiments the debugging tool would then add some code that invokes that method,

```
<'
//(1)
unit channel_scoreboard_u like any_unit {
  channel_id: cdn_clab_audio_channel_id_t;
  predict_output (trans: cdn_parallel_transfer, muter_en:
      bool, limiter_en: bool, limit_val: byte, parity_en: bool,
      inv_en: bool): cdn_multi_master_transfer is {
    result=new;
    result.channel=channel_id.as_a (bit);
    if (muter_en) then {
      result.data=0;
    } else if (limiter_en) then {
      result.data[31:24]=min(trans.data[31:24], limit_val-
          1);
      result.data[23:16]=min(trans.data[23:16], limit_val-
          1);
      result.data[15:8]=min(trans.data[15:8], limit_val-1);
      result.data[7:0]=min(trans.data[7:0], limit_val-1);
    } else {--no muter and no limiter
      result.data=trans.data,
    };
    if (parity_en) then {
      result.generate_parity( );
    } else {
      result.parity=0;
    };
    if (inv_en==TRUE) then {
      result.data=result.data^32'hffffffff;
    };
  };
};
extend sys {
//(2)
  test_unit:channel_scoreboard_u is instance;
  post_generate( ) is also {
    test_unit.channel_id=A;
  };
//(3)
  run( ) is also {
    var trans: cdn_parallel_transfer=new cdn_parallel-
        _transfer;
    var muter_en: bool=FALSE;
    var limiter_en: bool=TRUE;
    var parity_en: bool=TRUE;
    var inv_en: bool=FALSE;
    var limit_val: byte=0x73;
    var                                                res:
        cdn_multi_master_transfer=test_unit.predict_output
        (trans,      muteren,limiter_en,limit_val,parity_en,
        inv_en);
    print res;
  };
};
'>
```

The first segment is just a copied version of the method intended to be fixed and tested.

The second segment is instantiating the unit (a special object in e-language) that holds that method. It also ensures finding all the fields of that unit that are used within the tested method and initialize their value as they were at the time of the method invocation. In this case the field channel_id is the only such field.

The third segment creates a variable for each of the parameters the tested method needs to receive and assigns them with the value the parameters got in the specific invocation. It then calls the tested method with these variables as parameters and prints the result.

The new test case is not ready yet. The variable trans, for example is an object of the type cdn_parallel_transfer, but that struct is not defined yet in the test. Some more additions are needed:

```
<'
//(3)
type cdn_parallel_data_t: uint (bits:32);
type cdn_multi_data_t: uint (bits:32);
type cdn_clab_audio_channel_id_t: [A,B];
//(1)
struct cdn_parallel_transfer like any_sequence_item {
  % data: cdn_parallel_data_t;
};
//(2)
struct cdn_multi_master_transfer like any_sequence_item {
  % data: cdn_multi_data_t;
  !parity: byte;
  channel: bit;
};
```

```
unit channel_scoreboard_u like any_unit {
    channel_id: cdn_clab_audio_channel_id_t;
    predict_output(trans: cdn_parallel_transfer, muter_en:
        bool, limiter_en: bool, limit_val: byte, parity_en: bool,
        inv_en: bool): cdn_multi_master_transfer is {
        result=new;
        result.channel=channel_id.as_a (bit);
        if (muter_en) then {
            result.data=0;
        } else if (limiter_en) then {
            result.data[31:24]=min(trans.data[31:24],limit_val-
                1);
            result.tdata[23:16]=min(trans.data[23:16],limit_val-
                1);
            result.data[15:8]=min(trans.data[15:8],limit_val-1);
            result.data[7:0]=min(trans.data[7:0],limit_val-1);
        } else {--no muter and no limiter
            result.data=trans.data;
        };
        if (parity_en) then {
            result.generate_parity( );
        } else {
            result.parity=0;
        };
        if (inv_en==TRUE) then {
            result.data=result.data^32'hffffffff;
        };
    };
};
extend sys {
    test_unit:channel_scoreboard_u is instance;
    post_generate( ) is also {
        test_unit.channel_id=A;
    };
    run( ) is also {
        var trans: cdn_parallel_transfer=new cdn_parallel-
            _transfer;
//(4)
        trans.data=0x97def6af;
        var muter_en: bool=FALSE;
        var_limiter en: bool=TRUE;
        var parity_en: bool=TRUE;
        var inv_en: bool=FALSE;
        var limit_val: byte=0x73;
        var                                          res:
            cdn_multi_master_transfer=test_unit.predict_output
            (trans, muter_en, limiter_en, limit_val, parity_en,
            inv_en);
        print res;
    };
};
'>
```

In the first segment the struct cdn_parallel_transfer and is defined making sure the only field it has that is actually mentioned in the tested method—data is defined.

In the second segment the struct cdn_multi_master_transfer is defined, which is the struct type of the result of the tested method. Here data, parity, and channel are defined—all are fields that are mentioned in the tested method. Other fields that the struct had in the original program are not defined as they are not needed.

The third segment includes some type declarations that are needed for the new fields to make sense.

Finally in the fourth segment the value of the data field of the trans variable is initialized.

There is still one thing missing. In the tested method another method called generate_parity is invoked. In order to allow the running of the new test a very similar process is carried out for this invoked method as we described hereinabove for the tested method namely: copy the code, check which fields it has and make sure to define them, check which non primitive types are related to it and make sure to define them, check which methods it calls and do the same process recursively for them, etc.

After this is all done this file is obtained:

```
<!
type cdn_parallel_data_t: uint(bits:32);
type cdn_multi_data_t: uint(bits:32);
type cdn_clab_audio_channel_id_t: [A,B];
struct cdn_parallel_transfer like any_sequence_item {
    % data: cdn_parallel_data_t;
};
struct cdn_multi_master_transfer like any_sequence_item {
    % data: cdn_multi_data_t;
    !parity: byte;
//(3)
    parity_enabled: bool;
    channel: bit;
//(4)
    init( ) is also {
        parity_enabled=TRUE;
    };
//(1)
    generate_parity( ) is {
        parity=calculate_parity( );
    };
//(2)
    calculate_parity( ): byte is {
        if (parity_enabled) then {
            for i from 0 to 3 {
                result ^=data[7+8*i:0+8*i];
            };
        } else {
            result=0;
        };
    };
};
unit channel_scoreboard_u like any_unit {
    channel_id: cdn_clab_audio_channel_id_t;
    predict_output(trans: cdn_parallel_transfer, muter_en:
        bool,limiter_en: bool,limit_val: byte,parity_en: bool,
        inv_en: bool):cdn_multi_master_transfer is {
        result=new;
        result.channel=channel_id.as_a (bit);
        if (muter_en) then {
            result.data=0;
        } else if (limiter_en) then {
            result.data[31:24]=min(trans.data[31:24], limit_val-
                1);
            result.data[23:16]=min(trans.data[23:16], limit_val-
                1);
            result.data[15:8]=min(trans.data[15:8], limit_val-1);
            result.data[7:0]=min(trans.data[7:0], limit_val-1);
        } else {--no muter and no limiter
            result.data=trans.data;
        };
        if (parity_en) then {
            result.generate_parity( );
        } else {
            result.parity=0;
        };
        if (inv_en==TRUE) then {
            result.data=result.data ^ 32'hffffffff;
        };
```

```
  };
};
extend sys {
  test_unit:channel_scoreboard_u is instance;
  post_generate( ) is also {
    test_unit.channel_id=A;
  };
  run( ) is also {
    var trans: cdn_parallel_transfer=new cdn_parallel-
      _transfer;
    trans.data=0x97def6af;
    var muter_en: bool=FALSE;
    var limiter_en: bool=TRUE;
    var parity_en: bool=TRUE;
    var inv_en: bool=FALSE;
    var limit_val: byte=0x73;
    var                                              res:
      cdn_multi_master_transfer=test_unit.predict_output
      (trans,    muter_en,limiter_en,limit_val,parity_en,
      inv_en);
    print res;
  };
};
'>
```

The first segment is a copy of the generate_parity code from the original program.

The second segment is a copy of the calculate_parity method being invoked in that method.

The third segment is defining the parity_enabled field that is mentioned in that method. Notice that the role of the field in the code determines whether it is should only be defined, or defined and initialized. If the field is only being set in the code (for example result.parity) there is no need to initialize it with a value. If, on the other hand, it is being used like parity_enabled is, it needs to be initialized. That is what the fourth segment does.

The test is now ready for running. If it is run this result is obtained:
Starting the test . . .
Running the test . . .
   res=cdn_multi_master_transfer-@2: cdn_multi_master_
    transfer of unit: channel_scoreboard_u
    --------------------------------------------@sn_sequen-
    ce_imp
0 !parent_sequence: (NULL)
1 !stripe_info: (NULL)
--------------------------------------------@my_test4
2 % data: 0x72727272
3 !parity: 0x00
4 parity_enabled: TRUE
5 channel: 0x0
No actual running requested.
Checking the test . . .
Checking is complete—0 DUT errors, 0 DUT warnings.

The part that is interesting is underlined and bold. It is evident that the result is still wrong because all that was created was a smaller environment that reproduces the same results as the original invocation of the tested method. According to some embodiments all of the above may be carried out automatically by the debugging tool, all the debugging expert has to do is to fix the code (in this case by removing the "−1"s) and run the newly create test again. The results would now be:
Starting the test . . .
Running the test . . .
   res=cdn_multi_master_transfer-@1: cdn_multi_master_
    transfer of unit:
    channel_scoreboard_u
    --------------------------------------------@sn_sequen-
    ce_imp
0 !parent_sequence: (NULL)
1 !stripe_info: (NULL)
--------------------------------------------@my_test_with_
    fix
2 % data: 0x73737373
3 !parity: 0x00
4 parity_ enabled: TRUE
5 channel: 0x0
No actual running requested.
Checking the test . . .
Checking is complete—0 DUT errors, 0 DUT warnings.

These results give the debugging expert a clear indication that the bug was fixed. That may be done without having to recompile the entire test environment and running the entire original test again.

Figure 4:
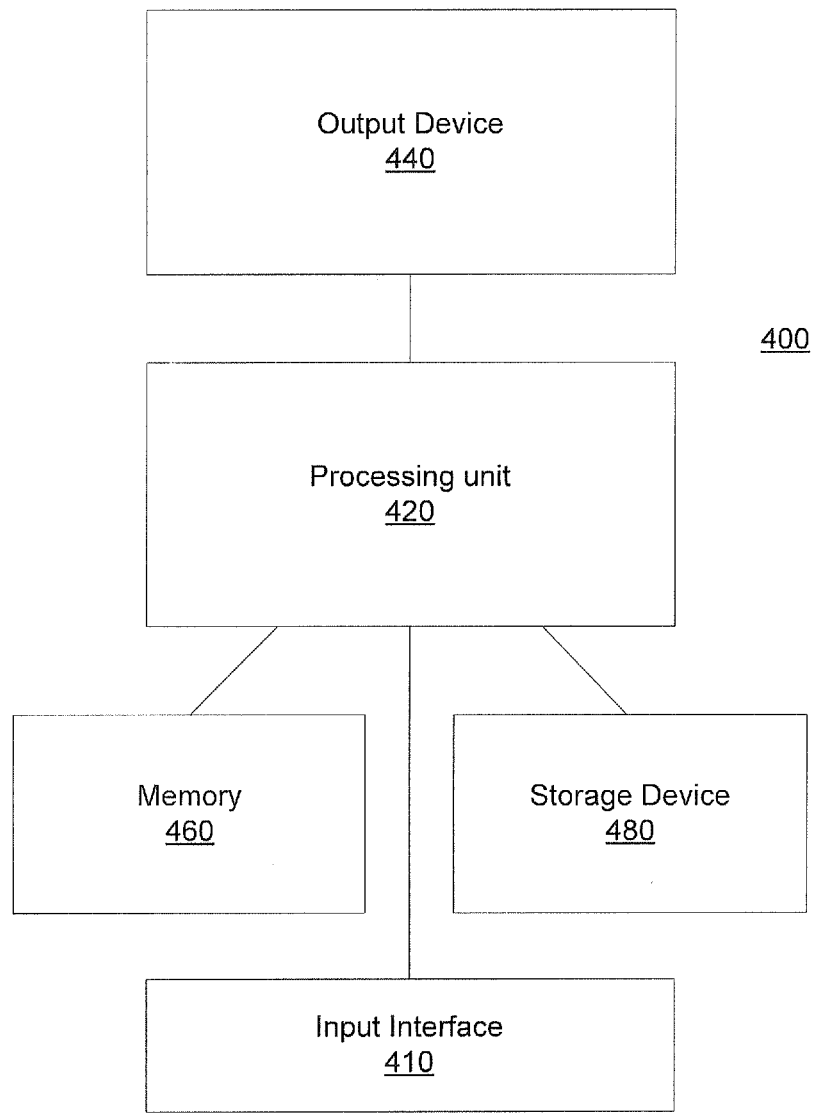
FIG. 4 illustrates a system for debugging according to some embodiments of the present invention.

FIG. 4 illustrates a system 400 for debugging according to some embodiments of the present invention.

System 400 may include a processing unit 420 (e.g. one or a plurality of computer processors, on a single machine or distributed on a plurality of machines) for executing a method according to some embodiments of the present invention. Processing unit 420 may be linked with memory 460 on which a program implementing a method according to some embodiments of the present invention and corresponding data may be loaded and run from, and storage device 480, which includes a non-transitory computer readable medium (or mediums) such as, for example, one or a plurality of hard disks, flash memory devices, etc. on which a program implementing a method according to some embodiments of the present invention and corresponding data may be stored. Processing unit 420 may be configured to carry out methods according to the present invention for example by executing code or software for example stored in memory 460. System 400 may further include an output device 440 (e.g. display device such as CRT, LCD, LED etc.) on which one or a plurality user interfaces associated with a program implementing a method according to some embodiments and corresponding data may be presented. System 40 may also include input device 410, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

What is claimed is:

1. A method of debugging a program, the method comprising:
   recording an execution of a program;
   obtaining from a user, via an input device, a selection of a portion of the program which is between trackable inputs and outputs, and which is a closest enclosing module that includes one or a plurality of modules in which a suspected bug exists, wherein the inputs were previously recorded in the recorded execution of the program, so as to track data that was passed through the inputs during a recorded previous simulation execution of the program, and one or a plurality of amendments to a code of the selected portion of the program;
   creating a new test file that instantiates an instance of the closest enclosing module; compiling, and simulating an execution on the new test file, that includes the selected portion of the program with the code amended by the one or a plurality of amendments, by providing through the inputs the data that was passed through said inputs during the recorded execution of the program; and
   presenting information relating to the simulated execution on an output device.

2. The method of claim 1, wherein the selected portion of the program comprises one or a plurality of methods.

3. The method of claim 2, further comprising obtaining an indication of a method invocation of the recorded execution of the program that revealed a suspected bug.

4. The method of claim 3, wherein the input data is obtained from local variables, global variables, parameters, objects, signals, registers, and other methods that are used or referred to by the indicated method.

5. The method of claim 1, further comprising obtaining a time window covering a time segment of the recorded execution of the program from a user and simulating the execution on the portion of the program, by providing through the inputs the data that was passed through said inputs during the recorded execution of the program within the time window.

6. A non-transitory computer readable storage medium for debugging a program having stored thereon instructions that when executed by a processor causes the processor to:
   record an execution of a program;
   obtain from a user, via an input device, a selection of a portion of the program which is between trackable inputs and outputs, and which is a closest enclosing module that includes one or a plurality of modules is in which a suspected bug exists, wherein the inputs were previously recorded in the recorded execution of the program, so as to track data that was passed through the inputs during a recorded previous simulation execution of the program, and one or a plurality of amendments to a code of the portion of the program;
   create a new test file that instantiates an instance of the closest enclosing module; compile, and simulate an execution on the new test file, that includes the selected portion of the program with the code amended by the one or a plurality of amendments by providing through the inputs the data that was passed through said inputs during the recorded execution of the program; and
   present information relating to the simulated execution on an output device.

7. The non-transitory computer readable storage medium of claim 6, wherein the selected portion of the program comprises one or a plurality of methods.

8. The non-transitory computer readable storage medium of claim 7, wherein the instructions when executed by a processor will cause the processor further to obtain an indication of a method invocation of the recorded execution of the program that revealed a suspected bug.

9. The non-transitory computer readable storage medium of claim 7, wherein the instructions when executed by a processor will cause the processor further to obtain a time window covering a time segment of the recorded execution of the program from a user and simulate the execution on the portion of the program, by providing through the inputs the data that was passed through said inputs during the recorded execution of the program within the time window.

10. A system for debugging a program, the system comprising:
    a memory; and
    a processing unit configured to:
       record an execution of a program;
       obtain from a user, via an input device, a selection of a portion of the program which is between trackable inputs and outputs, and which is a closest enclosing module that includes one or a plurality of modules in which a suspected bug exists, wherein the inputs were previously recorded in the recorded execution of the program, so as to track data that was passed through the inputs during a recorded previous simulation execution of the program, and one or a plurality of amendments to a code of the portion of the program;
       create a new test file that instantiates an instance of the closest enclosing module; compile, and simulate an execution on the new test file, that includes the selected portion of the program with the code amended by the one or a plurality of amendments, by providing input through the inputs the data that was passed through said inputs during the recorded execution of the program; and
       present information relating to the simulated execution on an output device.

11. The system of claim 10, further comprising the output device.

12. The system of claim 10, further comprising a storage device for storing on or a plurality of recorded executions of the program and one or a plurality of recorded simulated executions of the portion of the program.

13. The system of claim 10, wherein the processing unit is further configured to obtain a time window covering a time segment of the recorded execution of the program from a user and simulate the execution on the portion of the program, by providing through the inputs the data that was passed through said inputs during the recorded execution of the program within the time window.

* * * * *